United States Patent [19]
Erickson et al.

[11] Patent Number: 5,921,724
[45] Date of Patent: Jul. 13, 1999

[54] INSERT AND TOOLHOLDER FOR MACHINING OPERATIONS

[75] Inventors: Robert A. Erickson, Raleigh, N.C.; Michael D. Gibney, Sturbridge, Mass.

[73] Assignee: Kennametal Inc., Latrobe, Pa.

[21] Appl. No.: 08/992,980

[22] Filed: Dec. 18, 1997

[51] Int. Cl.⁶ .................................................. B23B 27/16
[52] U.S. Cl. ........................... 407/117; 407/109; 407/110
[58] Field of Search ................................... 407/117, 110, 407/102, 107, 109, 111, 50

[56] References Cited

U.S. PATENT DOCUMENTS

| | | | |
|---|---|---|---|
| 1,047,205 | 12/1912 | Gorton . | |
| 2,062,607 | 12/1936 | Reaney | 29/96 |
| 3,197,841 | 8/1965 | Frommelt et al. | 29/96 |
| 3,688,366 | 9/1972 | Jones | 29/96 |
| 3,775,817 | 12/1973 | Hertel | 29/96 |
| 3,780,408 | 12/1973 | McCreery | 29/96 |
| 3,785,021 | 1/1974 | Norgren | 29/96 |
| 3,894,322 | 7/1975 | Pano | 29/96 |
| 4,001,925 | 1/1977 | Eriksson | 29/96 |
| 4,558,974 | 12/1985 | Pano | 407/50 |
| 4,580,930 | 4/1986 | Zinner | 407/110 |
| 4,583,887 | 4/1986 | Wertheimer | 407/116 |
| 4,588,333 | 5/1986 | Gastafson | 407/117 |
| 4,645,385 | 2/1987 | Keller | 407/105 |
| 4,754,671 | 7/1988 | Toffolon | 82/2.5 |
| 4,801,224 | 1/1989 | Pettersson et al. | 407/110 |
| 4,844,668 | 7/1989 | Pettersson | 407/117 |
| 4,887,945 | 12/1989 | Pano | 407/110 |
| 4,938,641 | 7/1990 | Maier | 407/110 |
| 4,992,007 | 2/1991 | Satran | 407/110 |
| 5,022,796 | 6/1991 | Pano et al. | 407/113 |
| 5,035,545 | 7/1991 | Zinner | 407/110 |
| 5,076,738 | 12/1991 | Pano et al. | 407/117 X |
| 5,085,541 | 2/1992 | Simpson, III | 407/110 |
| 5,346,335 | 9/1994 | Harpaz et al. | 407/117 X |
| 5,360,298 | 11/1994 | Hedlund | 407/110 |
| 5,375,948 | 12/1994 | Lindstedt | 407/117 X |
| 5,411,354 | 5/1995 | Gustafsson | 407/110 |
| 5,516,241 | 5/1996 | Plutschuck et al. | 407/110 |

FOREIGN PATENT DOCUMENTS

| | | | |
|---|---|---|---|
| 3119834 | 12/1982 | Germany . | |
| 3319799 | 12/1984 | Germany | 407/107 |
| 3420653 | 12/1985 | Germany | 407/110 |

*Primary Examiner*—Andrea L. Pitts
*Assistant Examiner*—Henry W. H. Tsai
*Attorney, Agent, or Firm*—John J. Prizzi

[57] ABSTRACT

A cutting insert and toolholder for metalworking operations in which the insert is mechanically captured by a resilient clamping arm within a recess of the toolholder secured at three distinct locations. In one embodiment, a clamping arm resiliently secures the insert within the toolholder while in another embodiment a clamping arm is positively displaced to secure the insert within the toolholder.

19 Claims, 4 Drawing Sheets

INSERT AND TOOLHOLDER FOR MACHINING OPERATIONS

FIELD OF THE INVENTION

The invention is directed to tooling for machining operations and more specifically directed to a cutting insert and a toolholder that may be utilized in a variety of machining operations.

BACKGROUND OF THE INVENTION

A machining operation for the removal of material from a workpiece is typically performed by rotating a workpiece and operating upon the workpiece with a cutting insert held by a toolholder which is not rotating. The toolholder may be positioned relative to the workpiece such that a variety of applications including parting, grooving, face grooving or profiling may be performed upon the workpiece. However, typically, a toolholder and insert are designed to perform one and possibly two of these applications and, for that reason, a complete set of tooling hardware often involves a number of different toolholders and cutting inserts, each dedicated to a limited range of applications.

In each of these applications, it is desirable to maintain the insert securely within the toolholder and also to positively locate the insert within the toolholder thereby providing machining operations with a high level of accuracy.

U.S. Pat. No. 4,801,224 by Pettersson et al, entitled "Tool and Insert for Chip Removal", teaches a cutting insert which is clamped by a toolholder having a resilient clamping arm. The clamping arm contacts a planar abutment surface on the insert body to position the insert against the clamping arm within the toolholder. However, the contact area between the clamping arm and the insert body is fairly small and provides limited stability to the insert.

Additionally, the cutting insert rests on a longitudinal surface which is parallel to the feed direction of the tool. As a result, a vertical force on the cutting insert will not urge the insert into the pocket of the toolholder.

An object of this invention is to provide a cutting insert and a toolholder for the same such that forces during the cutting operation act upon the insert to stabilize the insert within the holder.

Another object of this invention is to provide an insert and toolholder design which permit positive mechanical retention of the insert within the toolholder.

Another object of the invention is to provide a positive stop within the toolholder such that the insert may be mounted within the toolholder and positioned at a known location within the toolholder.

Another object of the invention is to provide a cutting insert and toolholder design that will allow for a large number of machining applications using a variety of different inserts which are compatible with the toolholder. In this manner the number of toolholders may be reduced.

Still another object of this invention is to provide a cutting insert and toolholder in which the toolholder contacts the insert in at least three distinct locations.

Another object of the invention is to provide a standard cutting insert body which is compatible with a toolholder but with a cutting area on the body which may be customized to fit the machining operation application.

SUMMARY OF THE INVENTION

A cutting tool comprising a toolholder having a recess and an insert is removably securable within the recess. The insert is comprised of a front face, a back face, a top face and a bottom face forming the insert perimeter and opposing side faces therebetween. The front face of the insert is comprised of a generally flat surface and intersects with the top face to form a cutting edge. The top face of the insert is comprised of a cutting region adjacent to the front face, a transition surface adjacent to the back face, and a lock therebetween. The back face of the insert is comprised of an abutment surface adjacent to the top face. Finally the bottom face is comprised of a linear surface extending from the front face to the back face.

Additionally, the toolholder is comprised of a support surface mateable with the bottom face of the insert, a clamping arm having a clamping surface opposing the support surface and mateable with the lock surface of the insert, and a locating surface therebetween mateable with the abutment surface of the insert, thereby defining three contact surfaces of the recess. The insert lock surface from the front face to the rear face diverges from the insert bottom face and forms a locking angle with the bottom face such when the insert is within the recess and the clamping arm is urged against the lock surface, the insert is captured within the recess by the clamping arm. Furthermore, the contact surfaces between the toolholder and the insert are non-planar, thereby providing lateral support between the toolholder and the insert.

The clamping arm may be an unrestrained cantilevered member extending from the toolholder base to resiliently captivate the insert within the toolholder or the clamping arm may be a cantilevered member urged against the insert through a mechanical means, such as a bolt extending between the clamping arm and toolholder base.

BRIEF DESCRIPTION OF THE DRAWINGS

The above as well as other features and advantages of the invention will become apparent through consideration of the detailed description in connection with the several drawings in which.

DESCRIPTION OF THE PREFERRED EMBODIMENT

Figure 1:
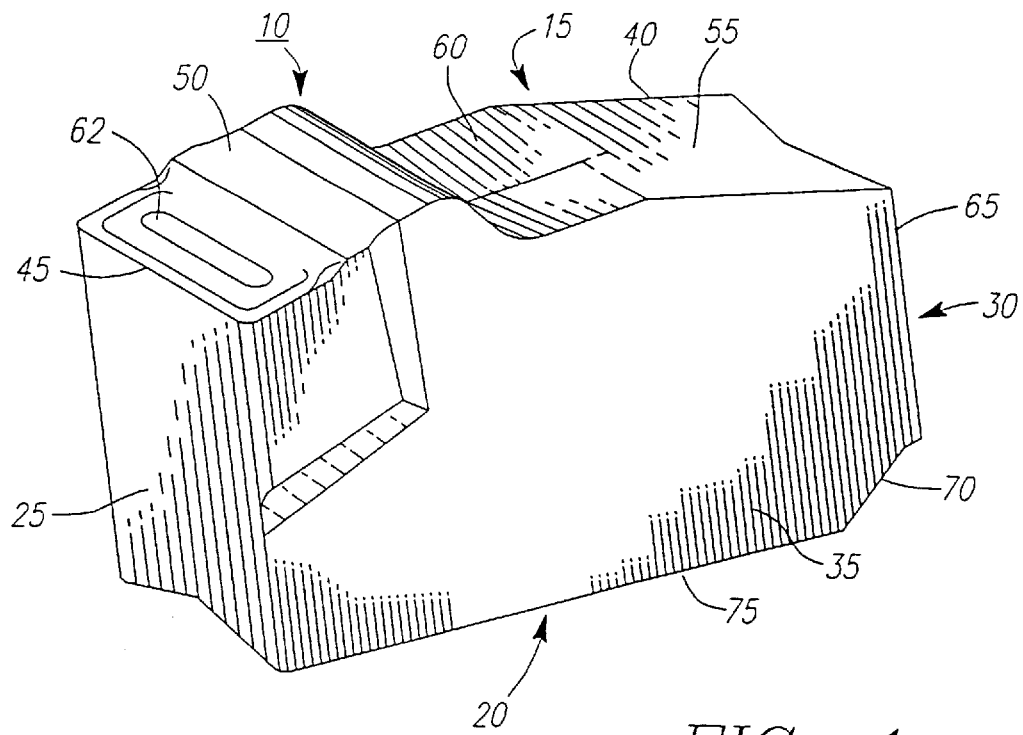
FIG. 1 is an isometric view of a cutting insert configuration according to the present invention.
Figure 2:
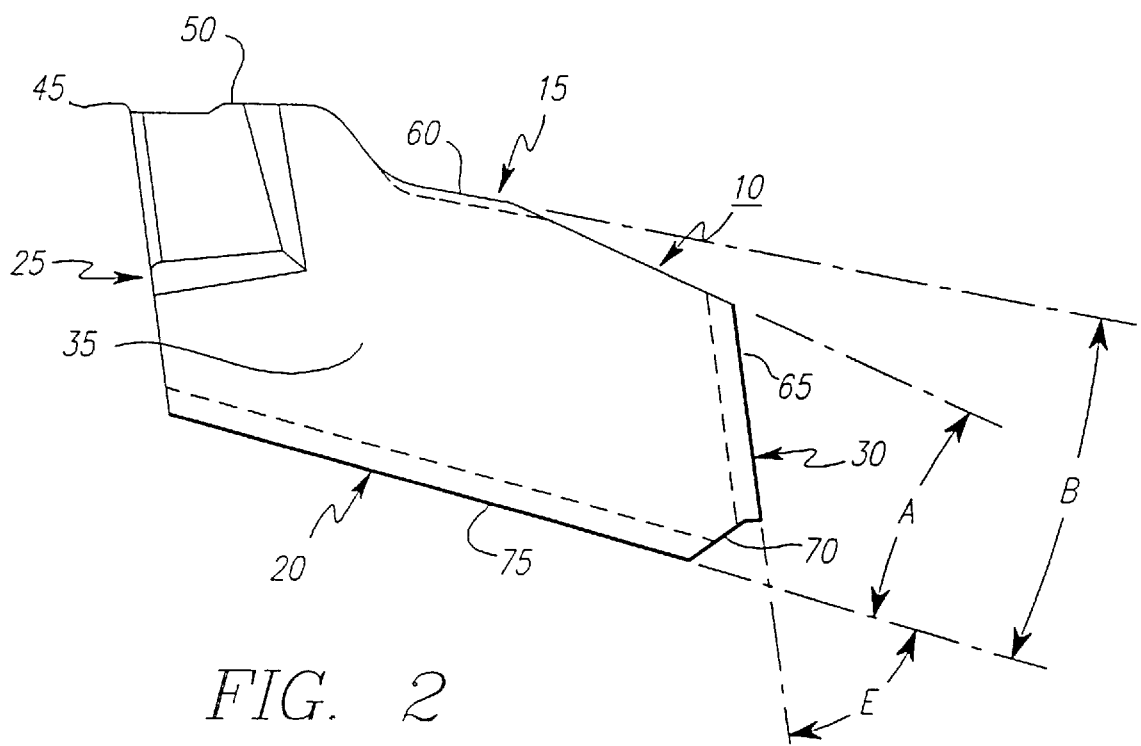
FIG. 2 is a side view of the cutting insert shown in FIG. 1.

FIGS. 1 and 2 illustrate a cutting insert 10 having a top face 15, a bottom face 20, a front face 25, and a back face 30 forming an insert perimeter and two opposing side faces 35 and 40 therebetween. The front face 25 is comprised of a generally flat surface and intersects with the top face 15 to form a cutting edge 45. The top face 15 is comprised of a cutting region 50 extending away from the cutting edge 45, a transition surface 55 extending forward from the back face 30 and a lock surface 60 therebetween. Included within the cutting region 50 may be geometrical configurations such as chip control features 62 used to enhance the performance of the insert 10.

The back face 30 of the insert 10 is comprised of an abutment surface 65 which is adjacent to the top face 15 and may additionally be comprised of a non-contacting surface 70 which is adjacent to the bottom face 20.

The bottom face 20 is comprised of a linear surface 75 extending from the front face 25 toward the back face 30.

As shown in FIGS. 1 and 2, the bottom face 20, the back face 30 and the lock surface 60 of the top face 15 have a generally V-shaped cross section. Note, however, while not shown in FIGS. 1 or 2, it is also possible to incorporate such a V-shaped cross section into the transition surface 55 of the top face 15 of the insert 10.

Figure 3:
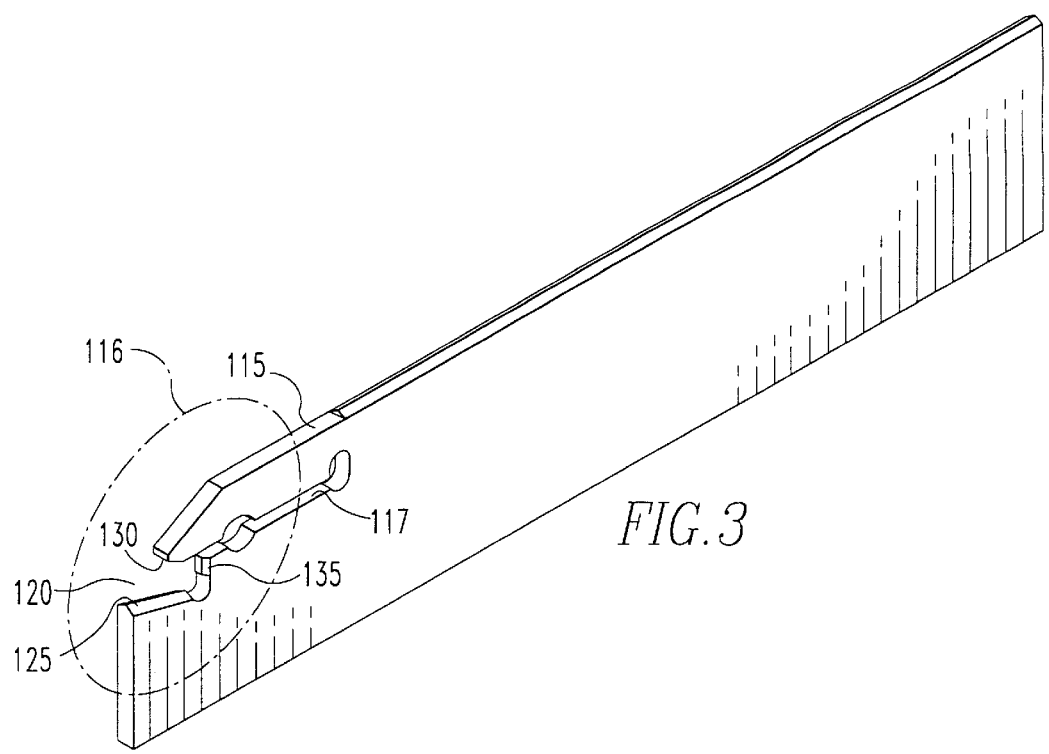
FIG. 3 is an isometric view of a toolholder having a resilient clamping arm according to the present invention.
Figure 4:
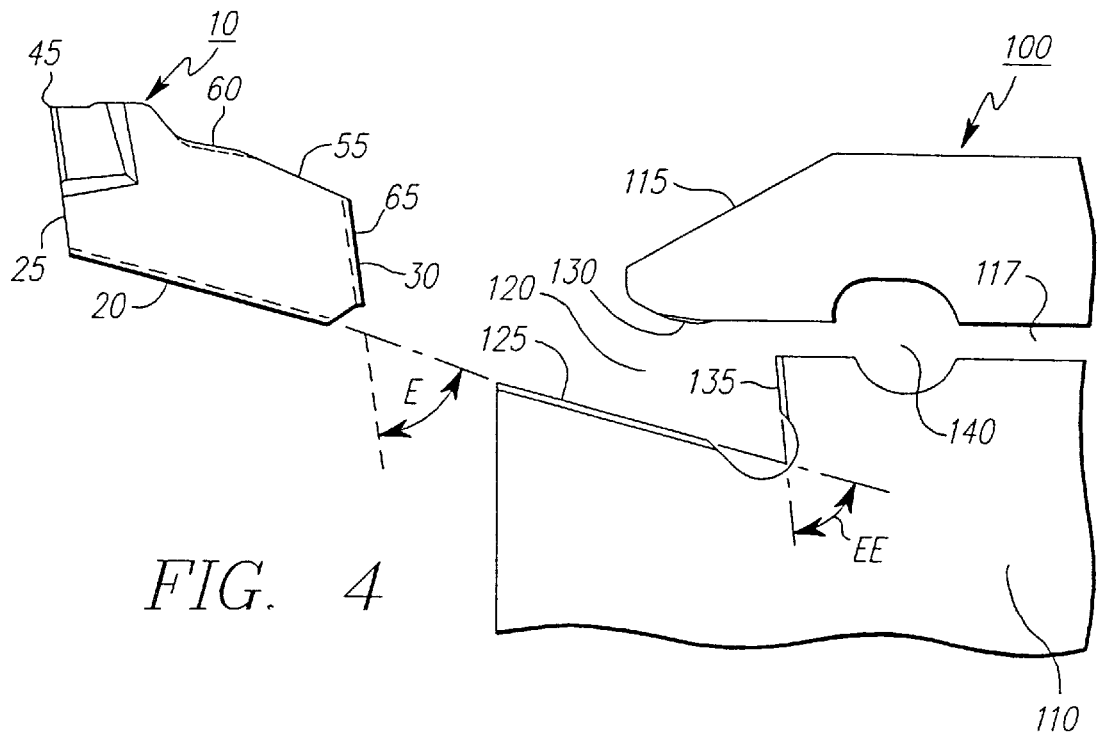
FIG. 4 is a side view of a portion of the toolholder according to the present invention with the insert detached from the toolholder.

FIG. 3 shows an isometric view of one embodiment of the toolholder of the present invention. A portion of the toolholder 100 indicated by window 116 in FIG. 3, along with an insert 10 aligned for insertion, is shown in FIG. 4. For convenience, FIGS. 3 and 4 will be discussed simultaneously.

The toolholder 100 shown in FIG. 3 is of the blade type and is comprised of a toolholder base 110 and a resilient clamping arm 115 connected to the base 110. The flexibility of the clamping arm 115 relative to the toolholder base 110 is determined, among other things, by the length of a slot 117 which defines a cantilevered length of the clamping arm 115. A recess 120 exists between the clamping arm 115 and the base 110 to receive the insert 10. Within the recess 120 is a support surface 125 mateable with the bottom face 20 of the insert 10.

The toolholder 100 with the associated insert 10 may, as mentioned, be used for a variety of applications including parting, grooving, face grooving and profiling. Typically, parting tools and grooving tools may produce cuts having a width of between about ¹⁄₁₆" to ¼". Such dimensions dictate the width of the elements used to clamp the insert 10. For that reason, as illustrated in FIG. 3, the toolholder 100 is also narrow.

Figure 7:
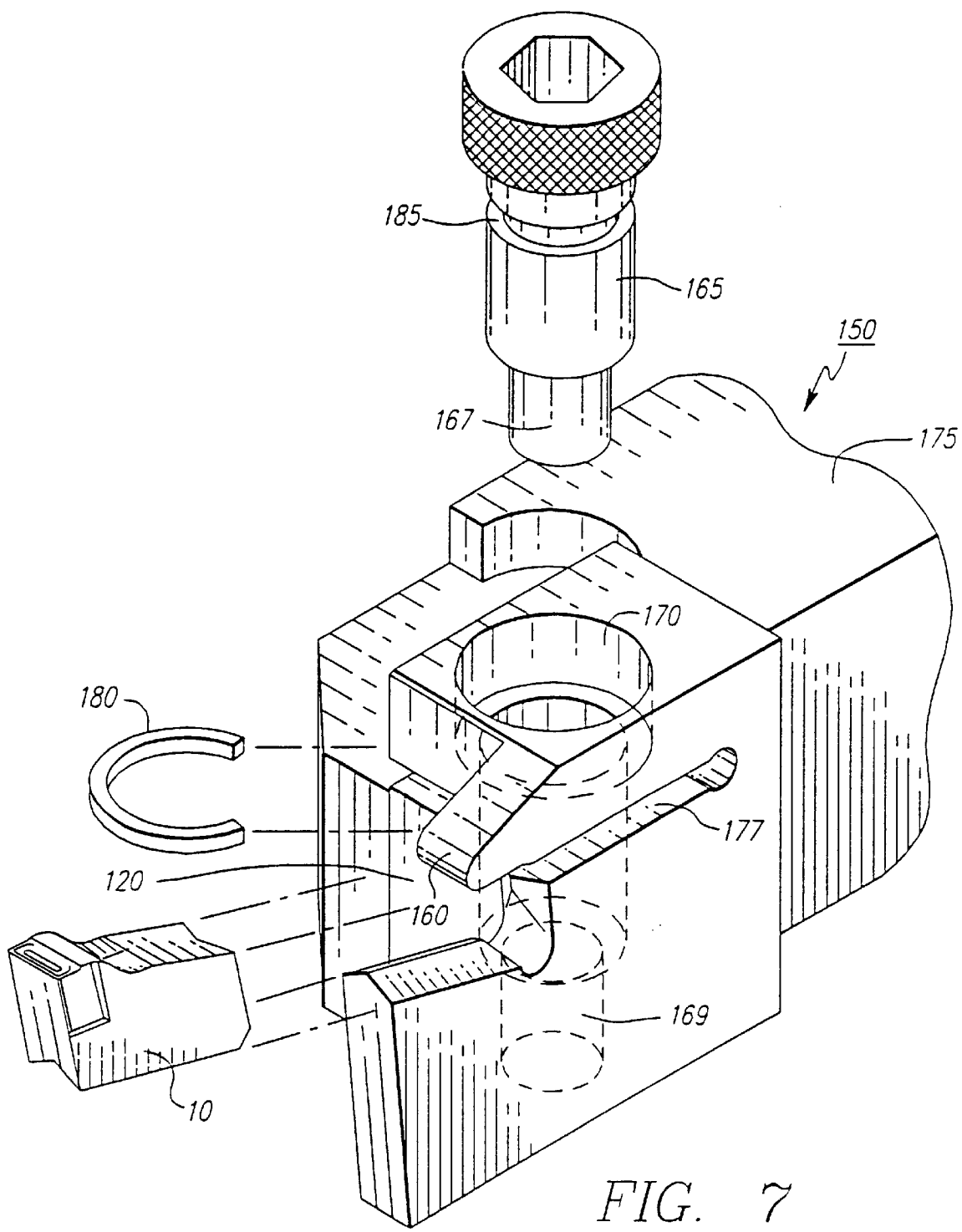
FIG. 7 is an isometric view of an alternative embodiment of the invention showing a toolholder having a clamping arm secured by a bolt.

Briefly turning to FIG. 7, the portion of the toolholder 150 which clamps the insert 10 is again no wider than the insert 10.

Returning to FIG. 3, the clamping arm 115 has a clamping surface 130 opposing the support surface 125 which is mateable with the lock surface 60 of the insert 10. Between the support surface 125 and the clamping surface 130 is a locating surface 135 which is mateable with the abutment surface 65 of the insert 10.

In such a manner, the insert 10 when positioned within the recess 120 is contacted at three locations which are the support surface 125 with the insert bottom face 20, the clamping surface 130 with the insert lock surface 60 and the locating surface 135 with the insert abutment surface 65.

Figure 5:
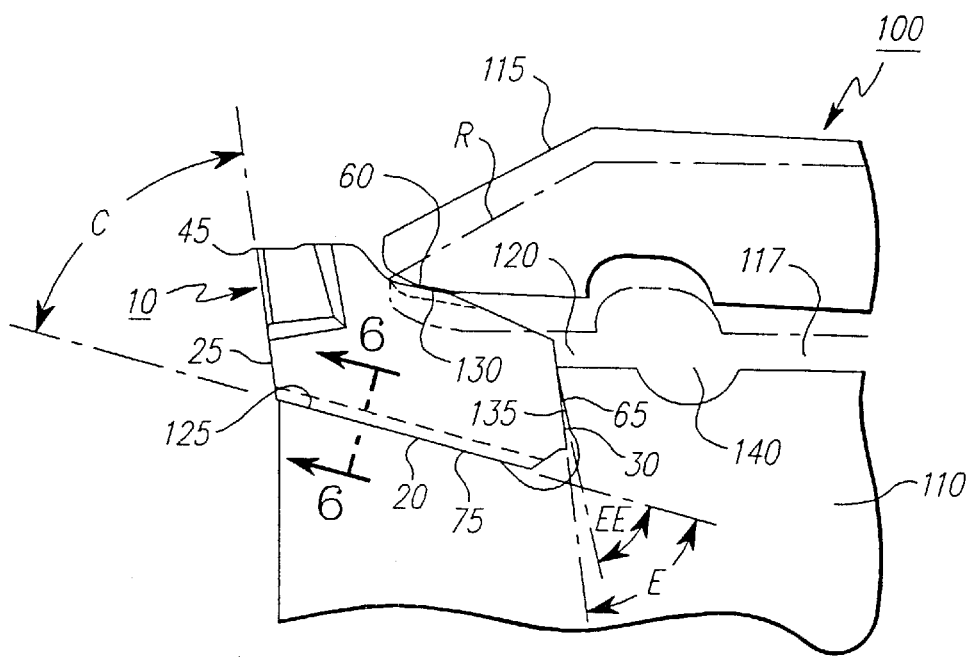
FIG. 5 is a side view of the cutting insert mounted within the toolholder shown in FIG. 4 according to the present invention.

The geometric relationships between the cutting insert 10 and the toolholder 100 provide unique features. As highlighted in FIG. 2 and illustrated in FIG. 4, the transition surface 55 from the front face 25 to the back face 30 may converge toward the insert bottom face 20 and form a transition angle A with the bottom face 20 such that the transition surface 55 provides a wedging ramp for insert insertion within the recess 120 of the toolholder 100. In this manner, when the insert 10 is introduced within the recess 120, the bottom face 20 contacts the support surface 125 and the transition surface 55 contacts the clamping surface 130. As the insert is urged within the recess the clamping surface 130 is displaced by the transition surface 55 until the clamping surface 130 contacts the lock surface 60 as shown in FIG. 5 and secures the insert 10 within the toolholder 100. In order to provide such a wedging feature, the transition angle A (FIG. 2) should be an acute angle within a range of 5° to 15° and preferably about 10°.

It should be appreciated, however, that the clamping arm 115 may be displaced using a tool (not shown), instead of the wedging action possible with the insert transition surface 55, thereby displacing the clamping surface 130 and making the recess 120 wider to accept the insert 10. If the clamping surface 130 is displaced enough in this manner, then the insert 10 may be positioned within the recess 120 until the clamping surface 130 is above the lock surface 60. The clamping arm 115 may then be released such that the clamping surface 130 engages the lock surface 60 of the insert 10. Under these circumstances, there is no need for the transition surface 55 to urge the clamping surface 130 away from the insert 10 and the importance of the relative angle between the transition surface 55 and the base 75 of the insert 10 is diminished such that the relative angle may be selected without the need for the angle to provide a surface capable of acting as a wedging ramp.

As seen in FIG. 5, the clamping arm 115 is urged away from the relaxed position shown in phantom as R. Since the arm 115 is resilient, then in the released condition, the clamping arm 115 acts to compress the insert 10 and to retain the insert 10.

This retention is enhanced by the relative angle of the lock surface 60 on insert 10. Specifically, as shown in FIG. 2, the lock surface 60 from the front face 25 to the rear face 30 diverges from the bottom face 20 and forms a locking angle B with the bottom face 20 such that when the insert 10 is within the recess 120 and the clamping arm 115 is urged against the lock surface 60, the insert 10 is captured within the recess 120 by the clamping arm 115. The clamping surface 130 of the clamping arm 115 has a limited area such that only the lock surface 60 of the insert 10 is contacted by the clamping surface 130. This self-capturing feature could exist over a wide range of locking angles B which are acute angles. However, an angle between 2° and 20° is preferred. Under such circumstances the insert 10 is positively captured within the recess 120 by the clamping arm 115.

Directing attention to FIG. 5, the forces generated during a machining operation are generally concentrated at or near the cutting edge 45 of the insert 10. To provide maximum support to the insert 10 in the region of the cutting edge 45 the front face 25 of the insert 10 is supported by the support surface 125 of the toolholder 100. To enhance retention of the cutting insert 10 within the recess 120, the support surface 125 of the toolholder is mateable with the bottom face linear surface 75 of the insert 10 and forms a ramp angle C with the front face 25. The ramp angle C is acute and may be between 80° and 50°, however, a preferred angle is 75°. As a result of the ramp angle, forces upon the cutting edge 45 urge the insert 10 further within the recess 120. Additionally, the locating surface 135 of the toolholder 100 acts as a positive stop for the abutment surface 65 of insert 10.

Although, as shown in FIG. 4, the insert abutment surface 65 and the toolholder locating surface 135 have mating cross sections, for the purposes of clarity such details will not be shown in FIG. 5.

The abutment surface 65 and the bottom face linear surface 75 form an insert seating angle E, as shown in FIGS. 2 and 5, which is an acute angle. The insert 10 is received against the locating surface 135 and support surface 125 which together form a pocket. In order to provide contact upon the insert 10 in an evenly distributed manner, the toolholder seating angle EE (FIG. 5) formed by the support surface 125 and the locating surface 135 is slightly smaller than the insert seating angle E. A preferred range for the insert seating angle E would be between 50° and 80° and a preferred angle is 67°. Whatever the angle, the toolholder seating angle EE may be less than the insert seating angle E by as much as 5°, however a preferred amount would be 1°. In this manner the insert 10 within the recess 120 tends to contact the upper portion of the locating surface 135 thereby providing a greater amount of lateral support to the insert 10 to resist any cutting forces tending to twist the insert 100. Even greater lateral support is available when the locating surface 135 is higher in the toolholder 110 such that the rearward surface 135 contacts the insert abutment surface 65 as close as possible to the insert transition surface 55, although this is not shown in FIG. 5.

Directing attention to the embodiment of the clamping arm 115 in FIG. 5, the clamping arm 115 is a resilient cantilevered member extending from the toolholder base 110. Once the insert 10 is inserted within the recess 120 then the clamping surface 130 of the clamping arm 115 contacts the lock surface 60 of the insert 10. The position of the clamping surface 130 relative to the recess 120 is such that the clamping arm 115 must be displaced upwardly to permit insert 10 within the recess 120. Furthermore, with the insert 10 positioned within the recess 120, the clamping arm will be stretched and will spring against the insert 10. The clamping arm 115 is positioned such that it will be urged against the lock surface 60 of the insert 10 thereby securing the insert 10 within the recess 120.

In order to remove the insert 10 from within the recess 120, the clamping arm 115 must again be displaced upwardly. One method of accomplishing this is through a member (not shown) introduced within opening 140 (FIGS. 4 and 5) and rotated thereby urging the clamping arm 115 away from the toolholder base 110 and providing clearance for removal of insert 10. Such a member may have an elliptical shaft or any configuration that would act to separate the clamping arm 115 from the member 110.

Figure 6A:
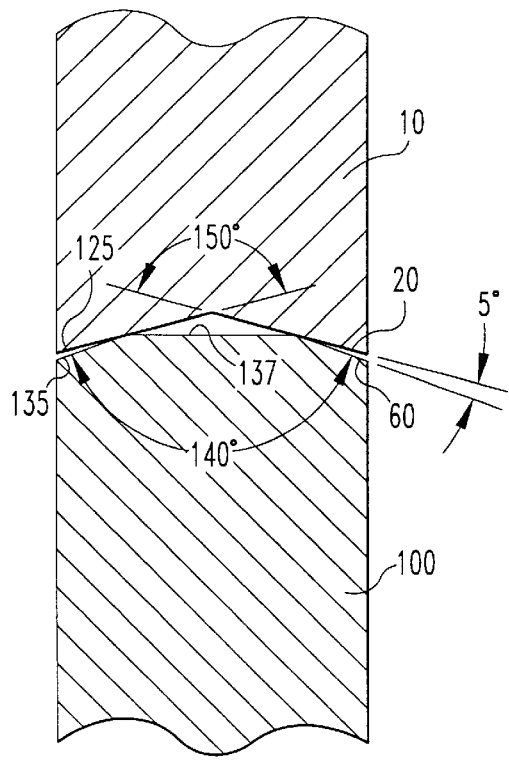
FIG. 6A, and FIG. 6B each is a cross section of a portion of FIG. 5 showing the contact points between the cutting insert and the toolholder according to the present invention.

FIG. 6A highlights a section view in FIG. 5 in which the mating surface between the insert 10 and toolholder 100 are non-planar and may be surfaces which are generally V-shaped. Specifically, the three locations on the toolholder at the support surface 125, the clamping surface 130 and the locating surface 135 are V-shaped and the three locations on the insert 10 at the bottom face 20, the lock surface 60 and the abutment surface 65 are also V-shaped such that the respective surfaces engage one another and provide lateral stability for the insert 10 within the toolholder 100.

It is preferred that the generally V-shaped cross sections mate such that these sections are not truly flush with one another. As an example, the angles formed by the adjacent surfaces of the V-shaped sections may vary up to 10° between that of the insert 10 and toolholder 110 as illustrated by the 5° angle on both sides of the insert 10 shown in FIG. 6A. Preferably, the V-shaped cross sections of the lock surface 60, abutment surface 65 and bottom surface 75 are approximately 150° while the mating V-shaped cross sections of the clamping surface 130, locating surface 135 and support surface 125 are approximately 140° in a fashion similar to that illustrated in FIG. 6A. In this manner, the insert 10 is self-centering within the toolholder 100. Those portions of the insert 10 which, as shown in FIG. 6A, have a concave V-shaped cross section will be compressed against the toolholder 100 surfaces thereby causing deformation of the toolholder 100 and insert 10 for better seating upon the toolholder stationary support surface 125 or the toolholder stationary rearward surface 135.

Figure 6B:
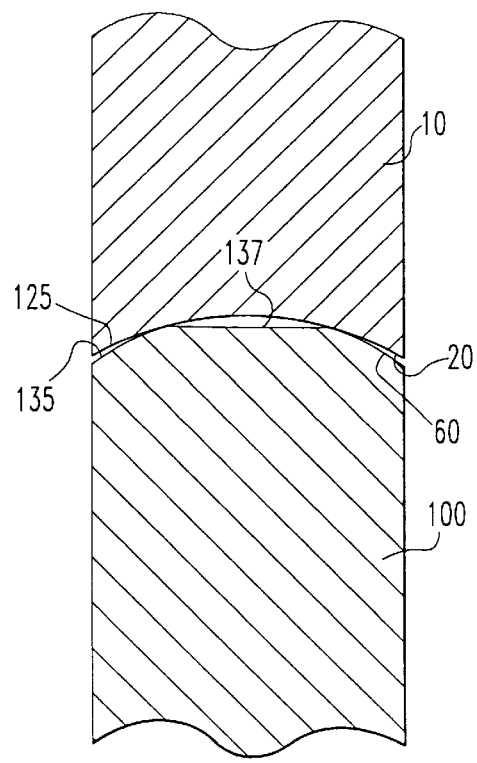

It should be appreciated that while in FIGS. 6A and 6B the insert 10 has concave V-shaped cross sections and the toolholder 100 has convex V-shaped cross sections, these shapes may be interchanged such that the insert has convex cross sections and the toolholder 100 has concave cross sections, or any combination thereof.

Furthermore, while V-shaped cross sections to promote seating between the insert 10 and toolholder 110 have been discussed and are illustrated in FIG. 6A, the cross-sectional configurations could also be arcuate arrangements involving curved surfaces. Arcuate cross sections could completely replace the existing V-shaped cross sections. FIG. 6B highlights an alternate embodiment of the cross section illustrated in FIG. 6A. In FIG. 6B, the mating surfaces between the insert 10 and the toolholder 100 form a generally V-shape but are curved. Specifically, the three contact locations between the insert 10 and toolholder 100 may be defined by arcuate surfaces. The curved surfaces associated with the insert bottom face 20 and the lock surface 60 have a curved surface with a radius greater than the radius of the curved surfaces of the toolholder support surface 125 and locating surface 135, respectively. While it is not possible to define an exact angle between these curved surfaces, there should be sufficient clearance to permit contact at two lines between each mating surface. Just as before, these cross sections, preferably, should not be truly flush with one another.

Note in each of FIGS. 6A and 6B there is a flat surface 137 which creates a gap between the mating surfaces. This feature is preferred to provide contact at two lines between the surfaces. If the generally V-shaped surfaces defined by the support surface 125 and the locating surface 135 of the toolholder were not divided by the flat surface 137, then contact at two lines may be difficult to achieve.

The toolholder 100 described up to this point has been a blade type toolholder having a resilient clamping arm. Such a toolholder is ideal when forces on the cutting edge are essentially downward with very little lateral force. Under other operating conditions some lateral forces may be introduced upon the cutting insert 10 such that the resiliency of the clamping arm 115 could be overcome and the insert 10 could be shifted within the toolholder 100. One such operation that provides lateral loads upon the insert 10 is profiling.

FIG. 7 illustrates a toolholder 150 which may be used to secure the insert 10 under those circumstances in which a lateral load is placed upon the insert 10. For clarity, the item numbers used to describe the insert 10 and the proximate area of the insert 10 will be the same as those previously used. A resilient clamping arm 160 coupled with a toolholder base 175 acts to retain an insert 10. However, unlike a purely cantilevered arrangement shown with the previous toolholder blade, a bolt 165 provides a clamping force to retain the insert 10 within the toolholder base 175, thereby providing a means for compressing the clamping arm 160 against the insert lock surface 60 and supplementing the force generated by the resilient clamping arm 160 against the insert 10. With the exception of the clamping arm 115, the toolholder 150 shown in FIG. 7 is identical to the toolholder 100 shown in FIG. 3 for securing an insert 10.

However, the toolholder 150 is of the square shank type and the clamping arm 160 is positively secured to provide greater rigidity for lateral loads. In order to secure the insert 10 within the recess 120, the clamping arm 160 may be held down over the insert 10 by a bolt 165 having a threaded section 167 which engages a threaded bore 170 extending within the toolholder body 175. In such a manner, the bolt 170 may be secured against the clamping arm to provide a clamping force to the insert.

In order to alleviate the need for a separate device to urge the clamping arm 160 from the toolholder base 175, a clip 180 may be aligned within the spring slot 177 and inserted over a groove 185 within the bolt 165 when the bolt 165 is secured within the bore 170. With this arrangement, the bolt 165 may not only be used to urge the clamping arm 160 against the insert 10, but may also be used to urge the clamping arm 160 away from the insert 10 to permit easy removal and insertion of the insert 10.

Just as mentioned with the toolholder 110 in FIGS. 3–6, if the clamping arm 160 is displaced to permit positioning the insert within the recess without contacting the top of the insert 10, then it is unnecessary for the transition segment 55 to act as a wedge with the toolholder 110.

While a bolt may be used to secure the clamping arm, it should be understood that other arrangements for securing the clamping arm are available and may be applied to the subject invention. As an example, a cam may be secured to the toolholder body in a location above the clamping arm such that rotation of the cam will apply a downward force to secure the clamping arm.

Furthermore, while a square shank toolholder 150 (FIG. 7) has been discussed, it should be understood the toolholder may be any shape that would accommodate the clamping features illustrated in FIG. 7.

It is thought the present invention and many of its attendant advantages will be understood from the foregoing description and it will be apparent that various changes may be made in the form, construction and arrangement of the parts thereof without departing from the spirit and scope of the invention or sacrificing all of its material advantages, the form herein before described being merely preferred or exemplary embodiments thereof.

What is claimed is:

1. A cutting tool comprising a toolholder having a recess and an insert removably securable within the recess, wherein:
   a) the insert is comprised of a front face, a back face, a top face and a bottom face forming the insert perimeter and opposing side faces therebetween, wherein:
      i) the front face is comprised of a generally flat surface and intersects with the top face to form a cutting edge, the top face is comprised of a cutting region adjacent to the front face, a transition surface is adjacent to the back face, and a lock surface therebetween,
      ii) the back face is comprised of an abutment surface adjacent to the top face, and
      iii) the bottom face is comprised of a linear surface extending from the front face to the back face;
   b) the toolholder is comprised of:
      i) a support surface mateable with the bottom face of the insert,
      ii) a clamping arm having a clamping surface opposing the support surface wherein the clamping arm is resiliently displaced to receive the insert and the clamping surface is mateable with the lock surface of the insert, and
      iii) a locating surface therebetween mateable with the abutment surface of the insert, thereby defining three contact surfaces of the recess;
   c) wherein the insert lock surface from the front face to the back face diverges from the insert bottom face and forms a locking angle with the bottom face such that when the insert is within the recess and the clamping arm is urged against the lock surface, the insert is captured within the recess by the clamping arm, and
   d) wherein the insert abutment surface, lock surface and bottom face have a non-planar cross section surface to engage similar non-planar cross section surfaces of the toolholder locating surface, clamping surface and support surface, respectively.

2. The cutting tool according to claim 1 wherein the insert transition surface in the direction from the front face to the back face converges toward the insert bottom face and forms an angle with the bottom face such that the transition surface provides a wedging ramp for insert insertion within the recess.

3. The cutting tool according to claim 1 wherein the front face and bottom face of the insert form an acute angle and wherein the support surface is parallel with the bottom face such that a force applied to the cutting edge in a downward direction approximately parallel with the front face will urge the insert against the locating surface.

4. The cutting tool according to claim 1 wherein the insert back face is further comprised of a non-contacting surface adjacent to the bottom face.

5. The cutting tool according to claim 1 wherein the support surface of the toolholder forms an acute angle with the locating surface of the toolholder.

6. The cutting tool according to claim 5 wherein the insert abutment surface forms an acute abutment angle with the insert bottom face.

7. The cutting tool according to claim 6 wherein the toolholder locating surface is non-parallel to the insert abutment surface such that the contact between the locating surface and the abutment surface occurs along a portion of each surface.

8. The cutting tool according to claim 7 wherein the contact between the locating surface and the abutment surface occurs at the upper portion of the abutment surface.

9. The cutting tool according to claim 8 wherein the locating surface is non-parallel with the insert abutment surface by approximately 1°.

10. The cutting tool according to claim 1 wherein the insert abutment surface, lock surface and bottom face have a V-shaped cross section to engage similar V-shaped cross sections of the toolholder locating surface, clamping surface and support surface, respectively.

11. The cutting tool according to claim 10 wherein the V-shaped cross section of the insert abutment surface, lock surface and bottom face is of a lesser angle than the mating V-shaped cross sections of the toolholder locating surface, clamping surface and support surface, respectively.

12. The cutting tool according to claim 11 wherein the V-shaped cross section of the abutment surface, lock surface and bottom surface are approximately 150° and the V-shaped cross sections of the toolholder support surface, clamping surface and locating surface are approximately 140°.

13. The cutting tool according to claim 1 wherein the insert abutment surface, lock surface and bottom face are generally arcuately shaped in cross section to engage similarly arcuately shaped cross sections of the toolholder locating surface, clamping surface and the support surface, respectively.

14. The cutting tool according to claim 13 wherein the arcuately shaped cross sections of the insert abutment surface, lock surface and bottom face are of a greater radius on the insert than the mating arcuately shaped cross sections of the toolholder locating surface, clamping surface and support surface, respectively.

15. The cutting tool according to claim 1 wherein the clamping arm extends from the toolholder as an unrestrained cantilevered member.

16. The cutting tool according to claim 1 wherein the clamping arm is positively positioned using means for compressing the clamping arm against the insert lock surface.

17. The cutting tool according to claim 16 wherein the means for compressing the clamping arm is a bolt secured to the toolholder and urged against the clamping arm to displace the arm against the insert.

18. A cutting tool comprising a toolholder having a recess and an insert removably securable within the recess, wherein:
   a) the insert is comprised of a front face, a back face, a top face and a bottom face forming the insert perimeter and opposing side faces therebetween, wherein:
      i) the front face is comprised of a generally flat surface and intersects with the top face to from a cutting edge, the top face is comprised of a cutting region adjacent to the front face, a transition surface is adjacent to the back face, and a lock surface is therebetween,
      ii) the back face is comprised of an abutment surface adjacent to the top face and a non-contacting surface adjacent to the bottom face, and
      iii) the bottom face is comprised of a linear surface extending from the front face to the back face;
   b) the toolholder is comprised of:
      i) a support surface mateable with the bottom face of the insert,
      ii) a clamping arm having a clamping surface opposing the support surface wherein the clamping arm is resiliently displaced to received the insert and the clamping surface is mateable with the lock surface of the insert, and
      iii) a locating surface therebetween mateable with the abutment surface of the insert, thereby defining three contact surfaces of the recess;
   c) wherein the insert lock surface from the front face to the back face diverges from the insert bottom face and forms a captivating angle with the bottom face such that when the insert is within the recess and the clamping arm is urged against the lock surface, the insert is captured within the recess by the clamping arm;
   d) wherein the insert transition surface from the front face to the rear face converges toward the insert bottom face and forms a transition angle with the bottom face such that the transition surface provides a wedging ramp for insert insertion within the recess; and
   e) wherein the insert abutment surface forms an acute abutment angle with the insert bottom face.

19. A cutting insert for removable insertion within a toolholder having a recess comprised of a front face, a back face, a top face and a bottom face forming the insert perimeter and opposing side faces therebetween, wherein:
   a) the front face is comprised of a generally flat surface and intersects with the top face to form a cutting edge, the top face is comprised of a cutting region adjacent to the front face, a transition surface is adjacent to the back face, and a lock surface is therebetween, wherein the insert transition surface from the front face to the rear face converges toward the insert bottom face and forms a transition angle with the bottom face such that the transition provides a wedging ramp for insert insertion within the recess;
   b) the back face is comprised of an abutment surface adjacent to the top face and a non-contacting surface adjacent to the bottom face;
   c) the bottom face is comprised of a linear surface extending from the front face to the back face; and
   d) the insert lock surface from the front face to the face diverges from the insert bottom face and forms a captivating angle with the bottom face such when the insert is within the recess and the clamping arm is urged against the lock surface, the insert is captured within the recess by the clamping arm.

* * * * *